US012779499B1

(12) United States Patent
Vanderbeken et al.

(10) Patent No.: US 12,779,499 B1
(45) Date of Patent: Nov. 3, 2026

(54) VERTICAL SEPARATOR WITH ELEVATED FEED INLET, MECHANICAL DEWATERING AND THERMOMECHANICAL CLEANING

(71) Applicants: Marc Vanderbeken, Brugelette (BE); Cedric Vanderbeken, Saint-Ghislain (BE); Olivier Vanderbeken, Sudbury (CA)

(72) Inventors: Marc Vanderbeken, Brugelette (BE); Cedric Vanderbeken, Saint-Ghislain (BE); Olivier Vanderbeken, Sudbury (CA)

( * ) Notice: Subject to any disclaimer, the term of this patent is extended or adjusted under 35 U.S.C. 154(b) by 18 days.

(21) Appl. No.: 19/541,641

(22) Filed: Feb. 17, 2026

Related U.S. Application Data

(60) Provisional application No. 63/973,277, filed on Feb. 1, 2026, provisional application No. 63/964,107, filed on Jan. 20, 2026.

(51) Int. Cl.
*B07B 1/20* (2006.01)
*B07B 11/08* (2006.01)

(52) U.S. Cl.
CPC ................ *B07B 1/20* (2013.01); *B07B 11/08* (2013.01); *B07B 2220/02* (2013.01)

(58) Field of Classification Search
CPC ........ B07B 1/20; B07B 11/08; B07B 2220/00
See application file for complete search history.

(56) References Cited

U.S. PATENT DOCUMENTS 4,106,705 A 8/1978 Nakamura
5,707,488 A * 1/1998 Markham ............ B01D 29/118 210/415
10,449,580 B2 10/2019 Massone
10,807,124 B2 10/2020 Oude Grotebevelsborg et al.
10,898,907 B2 1/2021 Vanderbeken
11,260,398 B2 3/2022 Cesaro et al.
11,453,010 B2 9/2022 Theodoulou et al.
2018/0369828 A1 12/2018 Vanderbeken

FOREIGN PATENT DOCUMENTS

EP 2 006 034 B1 8/2014
EP 3 057 720 B1 10/2014
EP 4063034 B1 8/2023
WO WO 2023/223273 11/2023

* cited by examiner

*Primary Examiner* — Jacob S. Scott
*Assistant Examiner* — Miraj T. Patel

(57) ABSTRACT

A vertical separator apparatus and method position the feed inlet above the lowest rotating vane (14), ensuring all feed material receives mechanical vane impact and is thrown centrifugally against a perforated screen (22). Three-way separation results: resilient materials are propelled upward by elastic rebound; low-density materials are lifted pneumatically to a top discharge (18); and moisture-laden organics are centrifugally dewatered and sink back against a single upward air flow to a bottom discharge (26). The apparatus converts kinetic energy from vane friction into heat to assist drying and optionally utilizes froth-assisted separation where bubble nucleation provides a buoyancy boost to hydrophobic plastics. An adjustable aperture at the bottom discharge regulates material retention time. Safe, low-temperature thermal enhancement at 40-90 degrees C. reduces contaminant viscosity to enable thermomechanical cleaning of plastic surfaces without phase change or fire risk.

17 Claims, 6 Drawing Sheets

FIG. 6 - THREE-WAY SEPARATION MECHANISM
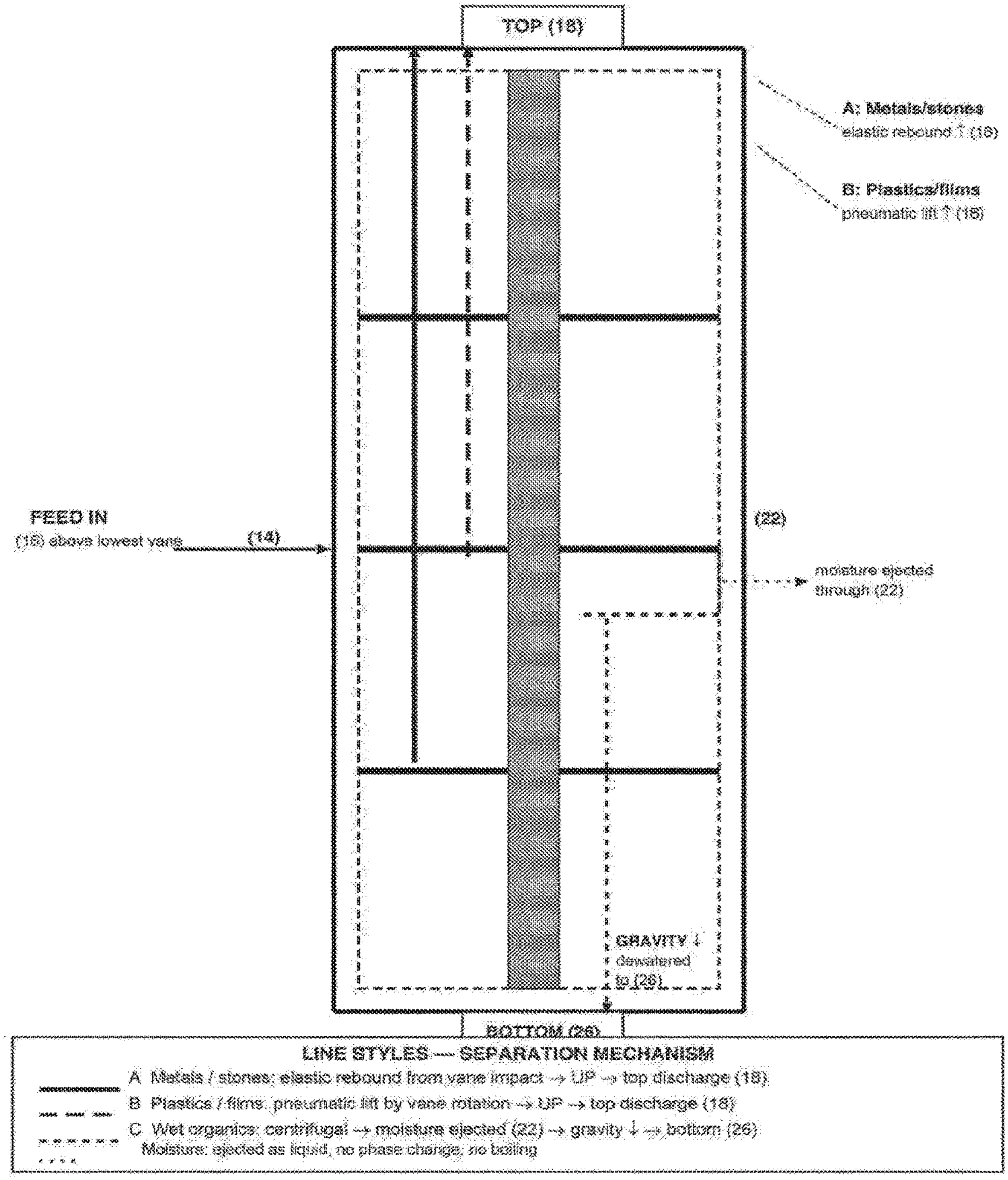

FIG. 7 - SINGLE UPWARD AIRFLOW AND MATERIAL SEPARATION
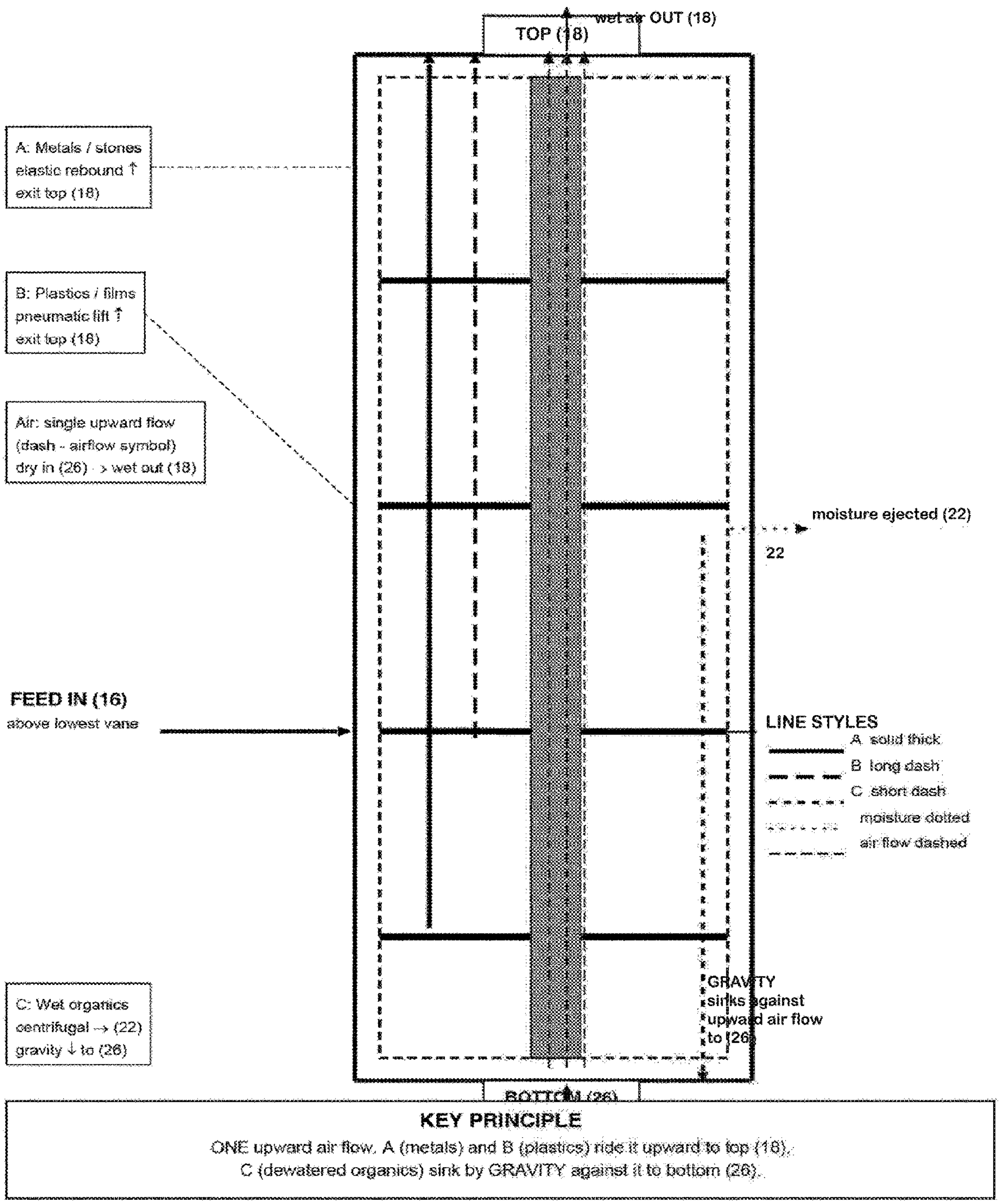
KEY PRINCIPLE
ONE upward air flow. A (metals) and B (plastics) ride it upward to top (18).
C (dewatered organics) sink by GRAVITY against it to bottom (26).

FIG. 8 - TEMPERATURE AND MOISTURE GRADIENTS: INHERENT SAFETY

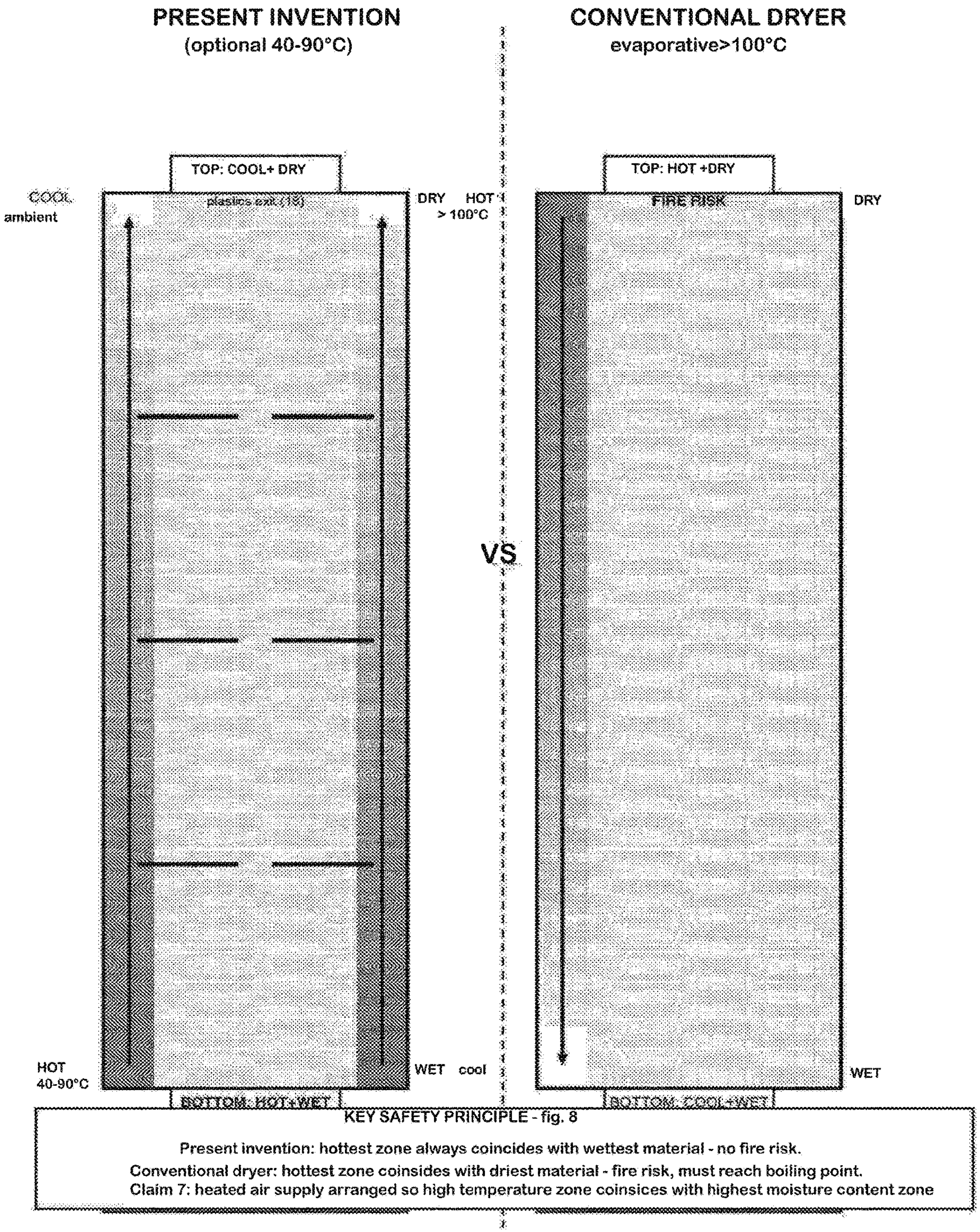

KEY SAFETY PRINCIPLE - fig. 8

Present invention: hottest zone always coincides with wettest material - no fire risk.

Conventional dryer: hottest zone coinsides with driest material - fire risk, must reach boiling point.

Claim 7: heated air supply arranged so high temperature zone coinsices with highest moisture content zone

VERTICAL SEPARATOR WITH ELEVATED FEED INLET, MECHANICAL DEWATERING AND THERMOMECHANICAL CLEANING

CROSS-REFERENCE TO RELATED APPLICATIONS

This application claims the benefit of U.S. Provisional Application No. 63/973,277, filed Feb. 1, 2026, which claims priority to U.S. Provisional Application No. 63/964,107, filed Jan. 20, 2026, both of which are incorporated by reference in their entirety.

FIELD OF THE INVENTION

This invention relates to vertical separators for separating and cleaning heterogeneous materials, and more particularly to apparatuses and methods that position a feed inlet above a lowest rotating vane to ensure all material receives vane action enabling three-way separation by resilience, density and moisture content, mechanical dewatering by centrifugal ejection of liquid droplets through a perforated screen, and thermomechanical cleaning of plastic surfaces by viscosity reduction of colloidal contaminants.

BACKGROUND OF THE INVENTION

Vertical separators using rotating vanes are known for separating heterogeneous materials. The rotating vanes impart mechanical force through direct impact and centrifugal action, performing the separation work. Conventional designs universally position the feed inlet at or near the bottom of the apparatus. Representative prior art includes U.S. Pat. Nos. 10,898,907, 10,807,124B2, EP3485303B1, 4,419,705, DE202009018696U1, WO2022/127341, 10,449,580, 4,106,705, 11,260,398, 11,453,010, WO2023/223273, and applicant's own EP4063034B1-all feeding at the bottom.

This bottom-feed configuration creates a fundamental problem: material entering at or below the lowest vane never receives complete mechanical action from the vanes. The apparatus operates at reduced efficiency because a significant portion of feed material bypasses the primary separation mechanism.

In bottom-feed designs, material entering below the vanes falls directly toward the perforated screen without full vane contact. This severely limits throughput and reduces the centrifugal dewatering action that the screen provides when material is properly worked by the vanes first.

A need exists for a separator configuration that ensures all feed material receives complete vane action, enabling full centrifugal impact against the perforated screen and the resulting three-way separation by resilience, density, and moisture content.

The filter-centric design paradigm assumes that the perforated screen is the primary separation mechanism, and therefore materials must contact the screen as early as possible in their passage through the apparatus. This assumption has led to persistent operational problems including material bypass, filter bottlenecks, frequent clogging, and limited throughput capacity. Prior art devices also typically employ closed bottom configurations with all discharge occurring through the perforated screen, which creates a throughput bottleneck and prevents efficient processing of materials that separate readily by density or resilience alone. The present invention overturns this paradigm by demonstrating that the rotating vanes perform the primary separation work, and that the perforated screen serves a fundamentally different and novel function as a mechanical dewatering surface under centrifugal pressure rather than as a filter through which all material must pass.

SUMMARY OF THE INVENTION

The present invention addresses this need by positioning a feed inlet above a lowest rotating vane. This elevated feed position ensures that all material receives complete vane action before any discharge. The vanes propel material upward and centrifugally outward against a perforated screen, enabling a three-way separation mechanism not achievable in bottom-feed designs.

In one aspect, the invention comprises a vertical separator apparatus having a rotor with vanes, wherein the feed inlet is positioned above the lowest vane. All material entering above the lowest vane receives vane impact, is thrown centrifugally against the perforated screen, and separates into three fractions: resilient materials bounce upward, low-density materials are lifted pneumatically, and moisture-laden materials lose moisture through the screen under centrifugal pressure and sink back through a vane array to a bottom discharge.

In another aspect, the feed inlet (16), positioned above the lowest vane, may be oriented tangentially to a housing circumference and aligned with a rotor rotation direction, to preserve material velocity and prevent accumulation at a feed point.

The perforated screen (22) performs dual functions: retaining material within a vane action zone and acting as a mechanical dewatering surface through which centrifugal force ejects liquid droplets as liquid, without phase change and without reaching boiling point, achieving dewatering at a fraction of the energy cost of conventional evaporative drying.

In a further aspect, an optional heated air supply at 40-90 degrees C. reduces the viscosity of colloidal contaminants such as greases and oils adhering to plastic surfaces. The weakened colloidal bond allows contaminants to detach under vane impact, sink back to a bottom discharge, while thermomechanically cleaned plastics exit at a top discharge.

In a further aspect, the invention provides the use of a vertical separator as described herein for thermomechanical surface cleaning of plastic materials, wherein heated air at 40-90 degrees C. reduces the viscosity of colloidal contaminants adhering to plastic surfaces, allowing said contaminants to detach under vane impact and centrifugal force while cleaned plastics exit at the top discharge.

BRIEF DESCRIPTION OF THE DRAWINGS

The invention will be better understood from the following detailed description when read in conjunction with the accompanying drawings.

FIG. 6 is a schematic diagram showing a separation mechanism: resilient and low-density materials traveling upward within a single air flow generated by vane (14) rotation, and moisture-depleted organics sinking by gravity against said air flow to the bottom discharge (26).

FIG. 7 illustrates a single air flow principle where vane rotation generates an upward air stream that carries a top fraction, while a bottom fraction sinks through the vane array after losing resilience and moisture at the screen (22).

FIG. 8 is a comparative diagram showing that a hottest zone of the apparatus coincides with a wettest material, rendering a thermomechanical cleaning process inherently safe.

DETAILED DESCRIPTION OF THE INVENTION

Figure 1:
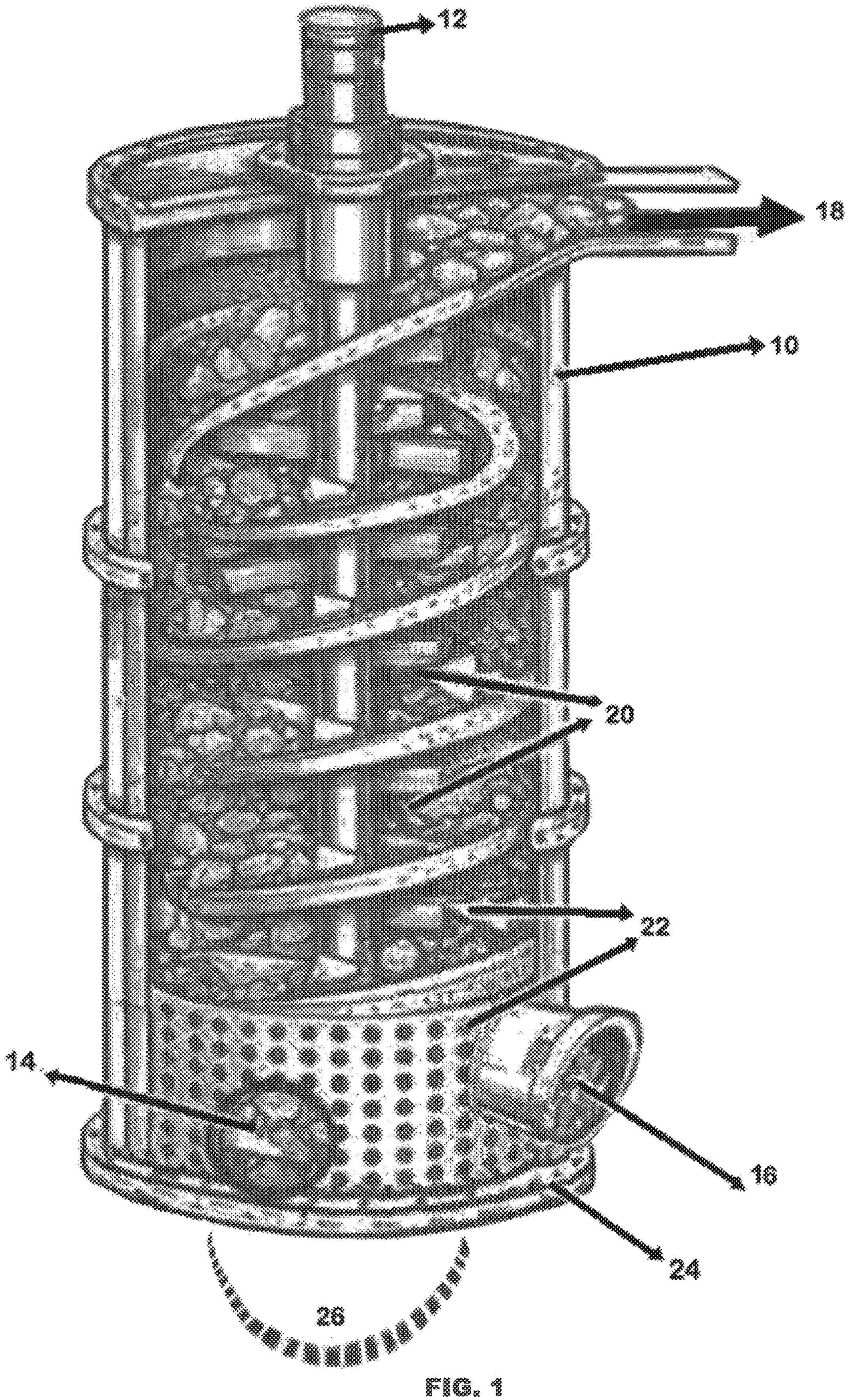
FIG. 1 is a cross-sectional view of the apparatus showing a cylindrical housing (10), a central shaft (12), rotating vanes (14) including a lowest vane position, an elevated tangential feed inlet (16), a top discharge (18), multiple vane rows (20), a perforated screen (22), a support structure (24), and an open bottom discharge zone (26).

Referring to FIG. 1, the vertical separator apparatus comprises a cylindrical housing (10) with a central shaft (12) supporting rotating vanes (14). Material enters through a feed inlet (16) positioned tangentially to the housing circumference, located above the lowest vane position.

Multiple vane rows (20) are mounted the shaft (12), arranged at different vertical heights. The vanes (14) impart mechanical force on materials through direct impact and centrifugal action. A perforated screen (22) surrounds the vane assembly. The screen (22) performs two functions: retaining material while the vanes work on it, and acting as a centrifugal dewatering surface through which moisture is expelled from wet organic materials under centrifugal pressure generated by vane rotation.

The critical feature of this invention is the positioning of the feed inlet (16) above the lowest vane. This elevated position ensures every particle receives vane impact and is thrown centrifugally against the perforated screen before any discharge occurs.

Referring to FIG. 6, the three-way separation mechanism operates as follows. Upon vane impact, all materials are first propelled upward and outward centrifugally against the perforated screen. At the screen, three distinct responses occur depending on material properties.

First, resilient materials including metals, stones, and rigid objects bounce elastically from vane impact. Their high resilience converts mechanical impact into upward momentum. These materials are propelled into an upward air stream and exit at a top discharge.

Second, low-density materials including plastics and films, after vane impact, are captured by an upward air flow generated by vane rotation and carried pneumatically to the top discharge within the single upward air stream.

Third, moisture-laden organic materials including wet organics and soggy fiber receive vane impact and are thrown centrifugally against the perforated screen. Under centrifugal pressure, moisture within these materials is expelled through the perforations of the screen. Having lost moisture and being too soft to bounce from vane impact, these now moisture-depleted materials sink back through a vane array and exit at an open bottom discharge against the single upward air flow.

This centrifugal dewatering action at the screen is a key function enabled by the elevated feed position. In bottom-feed designs, material that bypasses the vanes never receives sufficient centrifugal force against the screen for effective moisture expulsion. Only by ensuring all material receives full vane action through elevated feeding is this centrifugal dewatering consistently achieved.

Referring to FIG. 7, vane rotation generates a single upward air flow through the housing. Resilient materials and low-density materials travel upward within this air flow to the top discharge (18). Moisture-depleted organic materials sink by gravity against this same upward air flow to the bottom discharge (26). Separation is determined by material response to vane (14) impact and centrifugal dewatering at the screen (22), not by separate air streams.

The rotating vanes also create general air circulation through the apparatus. Dry air enters through an open bottom discharge zone (26) and exits at the top discharge (18) along with top-fraction materials. As air circulates upward, it absorbs moisture from all materials, providing additional drying in both output fractions beyond the centrifugal dewatering at the screen.

Figure 2:
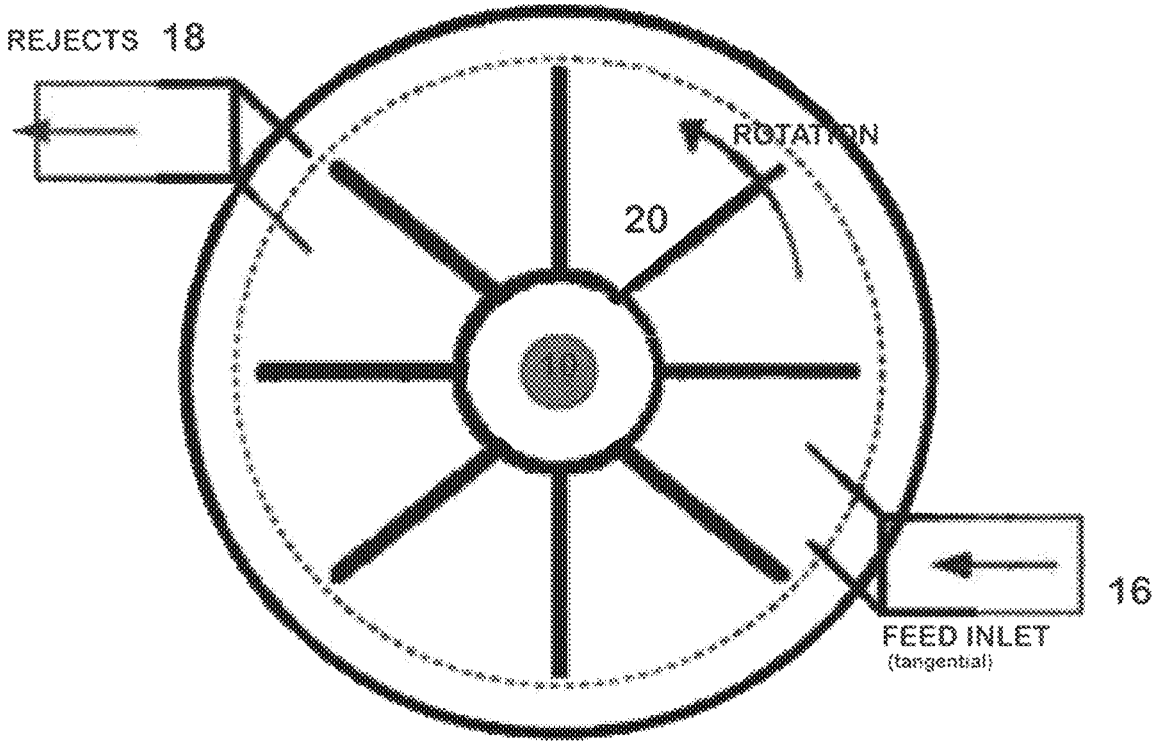
FIG. 2 is a top view showing the housing (10), the rotating vanes (14), the tangential feed inlet (16), and the top discharge (18), with an anti-clockwise rotation direction indicated.

Referring to FIG. 2, the top view shows the tangential orientation of the feed inlet (16). Material entering tangentially, aligned with rotation direction, maintains velocity and integrates smoothly into the rotating mass without accumulation at a feed point.

Figure 3:
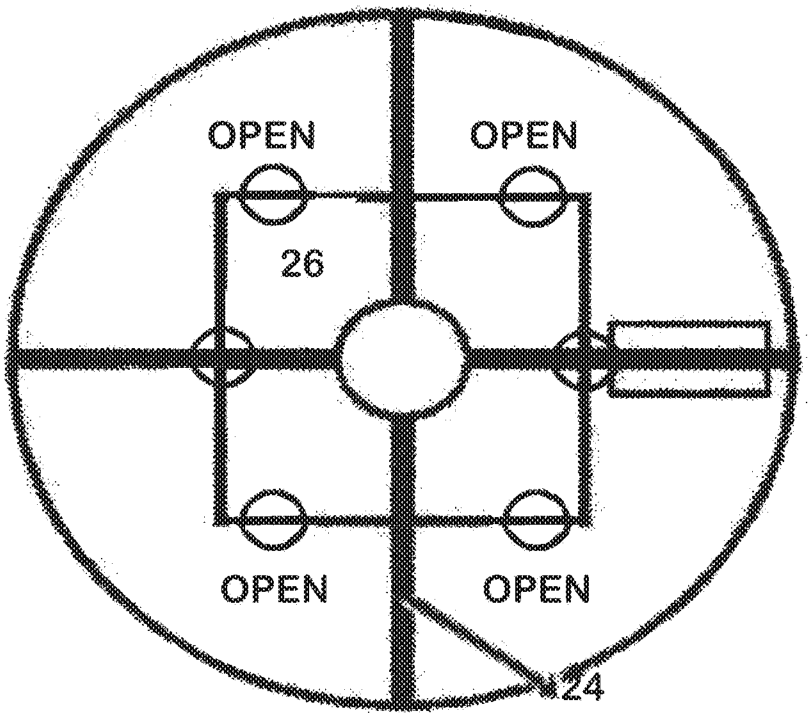
FIG. 3 is a bottom view showing the support structure (24) and the open bottom discharge zones (26).
Figure 4:
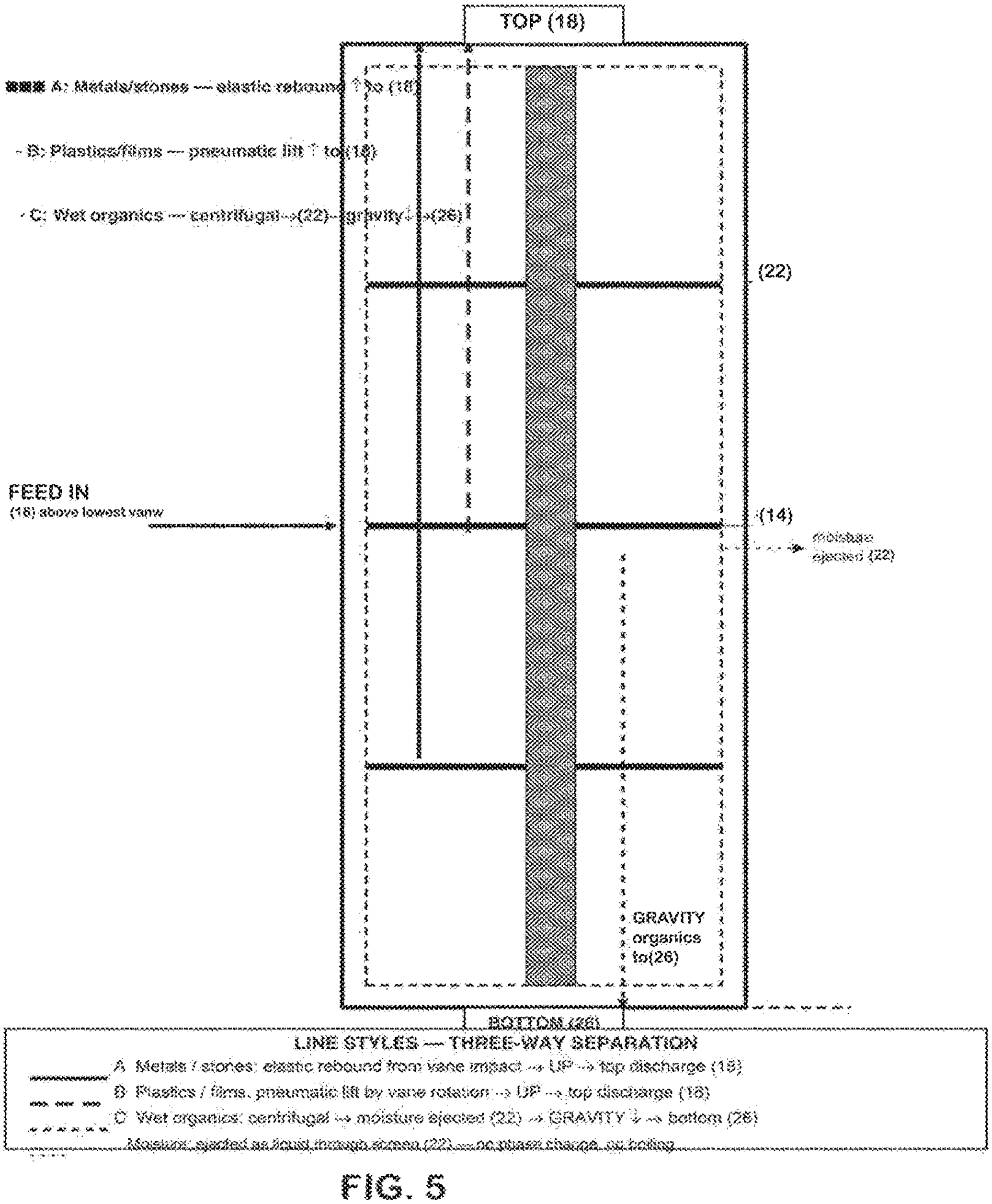
FIG. 4 is a material flow diagram showing three separation streams determined by material response to vane (14) impact and centrifugal dewatering at the screen (22).

Referring to FIG. 3, the bottom view shows a support structure (24) and open bottom discharge zones (26). The support structure maintains mechanical integrity while providing open areas for continuous gravity discharge of moisture-depleted organic materials after sinking back through the vane array.

A fundamental distinction of the present invention is a mechanism of moisture removal from processed materials. Conventional drying systems remove moisture by evaporation, requiring the material to be heated past a boiling point of water and consuming substantial energy to achieve a phase change from liquid to vapor. The present invention removes moisture by mechanical ejection: centrifugal force generated by vane rotation presses moisture-laden materials against the perforated screen, and liquid droplets are physically expelled through the screen perforations as liquid, not vapor. No phase change occurs. No boiling point must be reached. This mechanical dewatering requires a fraction of the energy of conventional evaporative drying and is effective even at ambient temperature.

As an optional thermal enhancement, the apparatus may include a heated air supply introducing air at 40-90 degrees C. into a processing chamber. At these temperatures, the primary benefit is not drying—mechanical ejection through the screen already achieves dewatering without heat—but thermomechanical cleaning of plastic surfaces. Greases, oils, and other organic contaminants adhere to plastic surfaces in a colloidal state, forming bonds that resist mechanical removal at ambient temperature. At 40-90 degrees C., the viscosity of these colloidal contaminants is substantially reduced. The weakened colloidal bond allows a contaminant to detach from a plastic surface under vane impact and centrifugal force. Once detached, the freed contaminant, being heavier and less resilient than the clean plastic, sinks back through the vane array and exits at the bottom discharge. The plastic exits at the top discharge substantially cleaner than it entered. This thermomechanical cleaning mechanism is distinct from and supplementary to the mechanical dewatering achieved by centrifugal ejection through the screen.

The 40-90 degrees C. temperature range provides optimal rheological effect on colloidal contaminants without fire risk and without requiring dedicated heating equipment in many industrial settings. Paper mill dryer sections, biogas plant heat exchangers, and other industrial processes generate waste heat in this range, making the thermal enhancement available at negligible energy cost through waste heat recovery. However, substantial separation and mechanical dewatering are achieved even at ambient temperature through vane action and centrifugal ejection at the screen alone.

In an optional embodiment, the apparatus utilizes a froth-assisted separation mechanism. As heated air (40-90 degrees C.) is introduced, it promotes in-situ bubble nucleation within a moisture-laden material. Due to a hydrophobic nature of plastic materials, these bubbles preferentially associate with plastic surfaces, creating bubble-plastic aggregates with reduced effective density. This aggregation provides a buoyancy boost that assists the single upward air flow in lifting contaminated plastics that might otherwise be too dense to respond to pneumatic action alone.

The rotating vanes (14) provide a specific kinetic energy input that converts to thermal energy through friction, material deformation, and direct impact. This kinetic heat bonus can contribute an additional 5-10 degrees C. to an internal processing zone temperature without additional energy consumption. By performing dual duty, the vanes simultaneously separate the material and assist in breaking capillary moisture bonds and reducing contaminant viscosity.

The open bottom discharge zone (26) may further comprise an adjustable aperture, such as an iris diaphragm or a set of interchangeable plates with varying diameters. This adjustment allows an operator to regulate a discharge rate of heavy materials, thereby controlling a retention time of the material within a vane interaction zone to optimize for different feedstocks.

Figure 5:
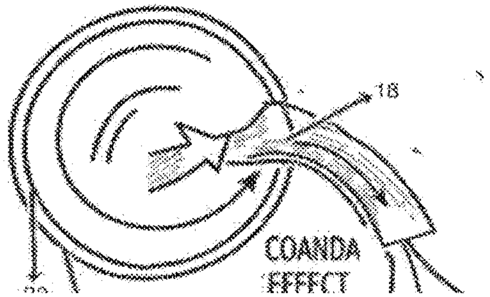
FIG. 5 is a detailed view of the tangential top discharge (18) where a Coanda effect preserves a tangential velocity of exiting liquids while solids exit via inertia.

Referring to FIG. 5, the top discharge (18) handles two physically distinct exit mechanisms simultaneously. Liquids and liquid droplets, being fluid and having high surface tension, are first pinned against an inner surface of the housing (10) by centrifugal pressure generated at 800 RPM. Upon reaching a discharge opening, these liquids exhibit a Coanda effect, adhering to and following a curved inner surface of a discharge chute to exit tangentially as a continuous liquid stream. In contrast, solid materials, including plastics and films, do not exhibit surface adhesion to the curved wall. Instead, these solids exit by inertia, where the centrifugal momentum imparted by the rotating vanes (14) launches them in a straight tangential trajectory that diverges from a curved liquid path directly through the discharge (18). Consequently, both fractions exit through the same discharge opening (18) but are separated by their differing physical responses to the curved geometry, preventing material fallback and ensuring continuous flow.

The apparatus operates with high reliability. The three-way separation requires no moving parts in the discharge zones. Maintenance requirements are minimal compared to designs using valves, gates, or complex discharge mechanisms.

Unlike conventional centrifugal separators that rely on gravity-based or non-accelerated discharge, the present invention utilizes a narrowing chute geometry to maintain a material velocity of 15-20 m/s. This velocity, combined with a radiused entry at a rectangular opening, ensures that an air flow does not expand or stall. Consequently, the liquids are effectively stripped via the Coanda effect, while the high-inertia plastics are projected cleanly in a focused stream.

Referring to FIG. 8, the optional thermal enhancement of 40-90 degrees C. is inherently safe by virtue of the apparatus geometry. Heated air enters at the bottom where material is wettest—moisture-laden organics accumulate at a lower vane zone before centrifugal dewatering at the screen. As material rises and loses moisture, the air temperature drops toward ambient at the top discharge. The hottest zone always coincides with the wettest material. Heat and dryness are never co-located. This is the inverse of a conventional evaporative dryer, where material must be heated past boiling point and the hottest zone coincides with the driest material, creating fire risk. The present invention achieves thermal enhancement and mechanical dewatering at 40-90 degrees C. with no boiling, no phase change, and no fire risk, and with waste heat recovery from industrial processes eliminating dedicated energy consumption entirely.

The invention is applicable to industrial separation of heterogeneous materials including organic waste, packaging materials, plastics, paper mill residues, and biogas plant feedstock. The apparatus serves paper mills, biogas facilities, recycling plants, and waste processing operations requiring separation with simultaneous mechanical dewatering and thermomechanical cleaning at high throughput. The invention is susceptible of industrial application in any industry requiring separation and surface cleaning of mixed solid materials by a combination of resilience, density, moisture content, and colloidal contaminant removal.

One skilled in the art will recognize that various modifications may be made to the described embodiment without departing from the scope of the invention as defined by the claims. The essential feature is positioning the feed inlet (16) above the lowest vane (14) to ensure complete vane action, centrifugal mechanical dewatering against the perforated screen (22), and thermomechanical cleaning of plastic surfaces for all feed material.

The invention claimed is:

1. An apparatus for separating heterogeneous materials comprising:
- a housing (10);
- a shaft (12) mounted within the housing (10);
- a plurality of vanes (14) mounted on the shaft (12), arranged in rows at different vertical heights defining a lowest vane position;
- a feed inlet (16) positioned above said lowest vane position, whereby all material entering through said feed inlet (16) receives mechanical impact from said vanes (14) and is thrown centrifugally against a perforated screen (22);
- the perforated screen (22) surrounding the vanes (14) through which liquid droplets are mechanically ejected from moisture-laden materials under centrifugal pressure generated by vane rotation; and
- a top discharge (18) for discharge of resilient materials propelled upward by elastic rebound from vane impact and low-density materials lifted by pneumatic action.

2. The apparatus of claim 1, wherein the feed inlet (16) is oriented tangentially to the housing circumference (10) and aligned with the rotor rotation direction.

3. The apparatus of claim 1, wherein the perforated screen (22) performs dual functions: retaining material within the vane action zone and acting as a mechanical dewatering surface through which liquid droplets are physically ejected as liquid, not vapor, under centrifugal pressure, requiring no phase change and no heating to boiling point.

4. The apparatus of claim 1, further comprising an open bottom discharge zone (26) comprising a support structure (24) defining open areas through which moisture-depleted organic materials discharge continuously by gravity after sinking back through the vane array.

5. The apparatus of claim 1, further comprising a heated air supply introducing air at a temperature of 40-90 degrees C. into the housing (10), whereby the elevated temperature reduces the viscosity of colloidal contaminants including greases and oils adhering to plastic surfaces, weakening the colloidal bond and allowing said contaminants to detach under vane impact and centrifugal force, said detached contaminants sinking to a bottom discharge while cleaned plastics exit at the top discharge (18).

6. The apparatus of claim 5, wherein the heated air supply is connected to a waste heat recovery system from an industrial process.

7. The apparatus of claim 5, wherein the heated air supply is arranged such that the highest temperature zone coincides with the highest moisture content zone of the material.

8. The apparatus of claim 5, wherein the heated air supply promotes bubble nucleation within moisture-laden material, said bubbles preferentially associating with hydrophobic plastic surfaces to create bubble-plastic aggregates with reduced effective density, thereby providing a buoyancy boost within the single upward air flow.

9. The apparatus of claim 5, wherein the heated air supply inlet is positioned at substantially the same vertical level as the feed inlet (16), such that heated air contacts incoming feed material upon or immediately prior to first vane impact, thereby inducing a thermal shock condition at the film-contaminant interface that coincides with maximum mechanical force generated by vane impact, said thermal shock reducing contaminant adhesion at the moment of peak centrifugal energy transfer.

10. The apparatus of claim 9, wherein the thermal shock condition induces differential thermal expansion between the plastic film surface and adhering contaminant layers, creating interfacial stress at the film-contaminant boundary that acts in combination with centrifugal force to delaminate contaminant layers from plastic surfaces.

11. The apparatus of claim 1, further comprising an adjustable aperture at a bottom discharge zone (26), wherein the aperture size is varied to regulate the retention time of material within the vane interaction zone.

12. The apparatus of claim 1, wherein the top discharge (18) is oriented tangentially to the housing (10) and initiates as a rectangular opening with a rounded transition, and further comprises a narrowing chute geometry that maintains a material velocity of 15-20 m/s, whereby liquids pinned against the inner wall of the housing (10) by centrifugal pressure follow the curved geometry by Coanda effect and exit as a continuous tangential liquid stream, while solid materials including plastics and films exit by inertia in a straight tangential trajectory, separating both fractions through the same discharge opening (18) without material fallback.

13. A method of processing heterogeneous materials in a vertical separator comprising a housing (10), a shaft (12), a plurality of vanes (14) mounted on the shaft (12) arranged in rows defining a lowest vane position, a perforated screen (22) surrounding the vanes (14), a top discharge (18) and a bottom discharge (26), the method comprising:

feeding material above the lowest rotating vane (14) whereby all material receives vane impact and is thrown centrifugally against the perforated screen (22);

mechanically ejecting liquid droplets from moisture-laden organic materials through perforations of the screen (22) under centrifugal pressure generated by vane rotation, said ejection occurring as liquid without phase change and without reaching boiling point;

propelling resilient materials including metals and stones upward by elastic rebound from vane impact within a single upward air flow generated by vane rotation, to the top discharge (18);

lifting low-density materials including plastics and films upward by pneumatic action of said single upward air flow to said top discharge (18);

allowing moisture-depleted organic materials, having lost moisture through centrifugal ejection at the screen (22), to sink back by gravity against said single upward air flow through the vane array to the bottom discharge (26); and wherein separation of fractions is determined by material response to vane impact and centrifugal dewatering at the screen (22), resilient and low-density materials travelling upward and moisture-depleted organics sinking downward within the same single upward air flow.

14. The method of claim 13, wherein dry air entering through the bottom discharge (26) circulates upward through the apparatus and exits at the top discharge (18) carrying absorbed moisture, providing supplementary drying in addition to the centrifugal mechanical ejection at the screen (22).

15. The method of claim 13, further comprising introducing heated air at 40-90 degrees C. into the housing (10), whereby the elevated temperature reduces viscosity of colloidal contaminants adhering to plastic surfaces, weakening colloidal bonds so that said contaminants detach under vane impact and centrifugal force, said detached contaminants sinking to the bottom discharge (26) while thermomechanically cleaned plastics exit at the top discharge (18).

16. The method of claim 13, further comprising converting kinetic energy from the rotating vanes (14) into kinetic heat through friction and impact to raise the internal processing zone temperature by 5-10 degrees C., thereby assisting in capillary moisture bond-breaking independently of an external heat source.

17. A method of thermomechanical surface cleaning of plastic materials in a vertical separator comprising a housing (10), a shaft (12), a plurality of vanes (14) mounted on the shaft (12) arranged in rows defining a lowest vane position, a feed inlet (16) positioned above said lowest vane position, and a perforated screen (22) surrounding the vanes (14), the method comprising:

introducing heated air at 40-90 degrees C. into the housing (10) to reduce viscosity of colloidal contaminants adhering to surfaces of plastic materials;

feeding plastic materials through the feed inlet (16) above the lowest vane position whereby all plastic materials receive vane impact;

detaching colloidal contaminants from plastic surfaces under vane impact and centrifugal force, said detachment assisted by the reduced viscosity of the colloidal bond at 40-90 degrees C.; and discharging cleaned plastics at the top discharge (18) while detached contaminants exit at a bottom discharge.

* * * * *